(12) United States Patent
Rau

(10) Patent No.: US 6,273,952 B1
(45) Date of Patent: Aug. 14, 2001

(54) APPLICATOR FOR HIGH SOLIDS SIZING

(75) Inventor: Robert B. Rau, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/322,463

(22) Filed: May 28, 1999

(51) Int. Cl.[7] .................................................... B05C 1/08
(52) U.S. Cl. ........................ 118/261; 118/262; 118/257; 118/DIG. 20; 65/529; 65/532
(58) Field of Search ................................. 118/106, 118, 118/123, 208, 257, 261, 262, 420, DIG. 19, DIG. 20; 65/532, 529, 443; 427/356, 163.2, 165

(56) References Cited

U.S. PATENT DOCUMENTS

| | | | |
|---|---|---|---|
| 2,269,150 | * 1/1942 | Flynn | 118/DIG. 20 |
| 2,873,718 | * 2/1959 | Brautigam | 118/257 |
| 3,114,165 | 12/1963 | Koteles et al. | 15/236 |
| 3,392,702 | * 7/1968 | Warner | 118/262 |
| 3,642,203 | 2/1972 | Pewtress | 239/15 |
| 3,997,306 | 12/1976 | Hedden | 65/3 |
| 4,305,742 | 12/1981 | Barch et al. | 65/3.43 |
| 4,476,806 | 10/1984 | Lubniewski et al. | 118/110 |
| 4,540,610 | * 9/1985 | Conklin et al. | 118/420 |
| 4,542,106 | 9/1985 | Sproull | 501/38 |
| 4,869,200 | 9/1989 | Euverard | 118/200 |
| 4,927,869 | 5/1990 | Dana et al. | 523/502 |
| 5,122,396 | * 6/1992 | Rantanen | 118/262 |
| 5,789,329 | 8/1998 | Eastes et al. | 501/36 |
| 5,883,023 | 3/1999 | Martine et al. | 442/331 |
| 5,908,689 | 6/1999 | Dana et al. | 428/219 |

FOREIGN PATENT DOCUMENTS

| | | |
|---|---|---|
| WO 98/06551 | 2/1998 | (WO) . |
| WO 98/29349 | 7/1998 | (WO) . |

OTHER PUBLICATIONS

"Coating Rods Equipment, Processes and Applications", A Coating Rod Fact Sheet From R.D. Specialties.
Product Brochure from Paul N. Gardner Company, Inc.
*The Manufacturing Technology of Continuous Glass Fibres*, by K. L. Loewenstein (3rd Ed 1993) pp. 30–44, 47–60 and 115–135.
*The Manufacturing Technology of Continuous Glass Fibres*, by K. L. Loewenstein (3rd Ed 1993) pp. 85–107 and 165–172.
*The Manufacturing Technology of Continuous Glass Fibres*, by K. L. Loewenstein (3rd Ed 1993) pp. 237–291.
*Encyclopedia of Polymer Science and Technology*, vol. 6 (1967), pp. 505–712.

* cited by examiner

*Primary Examiner*—Laura Edwards
(74) *Attorney, Agent, or Firm*—Andrew C. Siminerio

(57) ABSTRACT

One aspect of the present invention is a film applicator for applying a coating to at least a portion of a surface of fibers, comprising: an enclosure having a reservoir to store a coating composition; a roller having a generally cylindrical surface positioned within the enclosure such that a first portion of the roller surface is immersed in the coating composition and a second portion of the roller surface extends through an opening in the enclosure to contact fibers; a drive to rotate the roller within the enclosure such that the surface of the roller can be coated with a film formed from the coating composition; and a bar positioned at least in close proximity to the roller surface, the bar having a contoured surface that provides a desired film thickness on the roller surface. In one particular embodiment of the invention, the bar includes a rod with a tightly wound wire, such that the wire forms the contoured surface along the length of the rod, and further includes a mounting arrangement to maintain the contoured surface of the bar in direct contact with the surface of the roller.

18 Claims, 4 Drawing Sheets

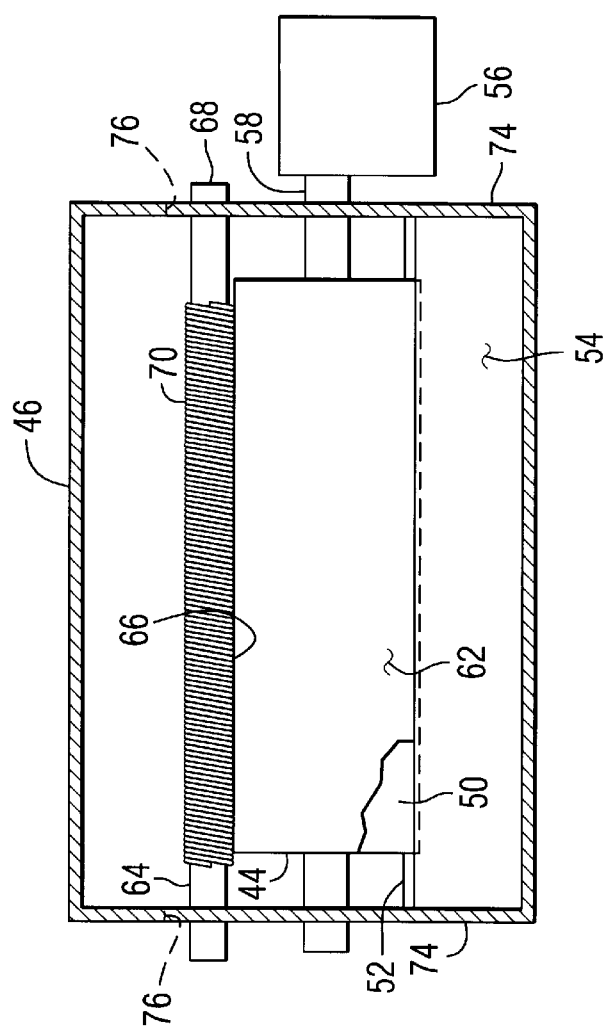
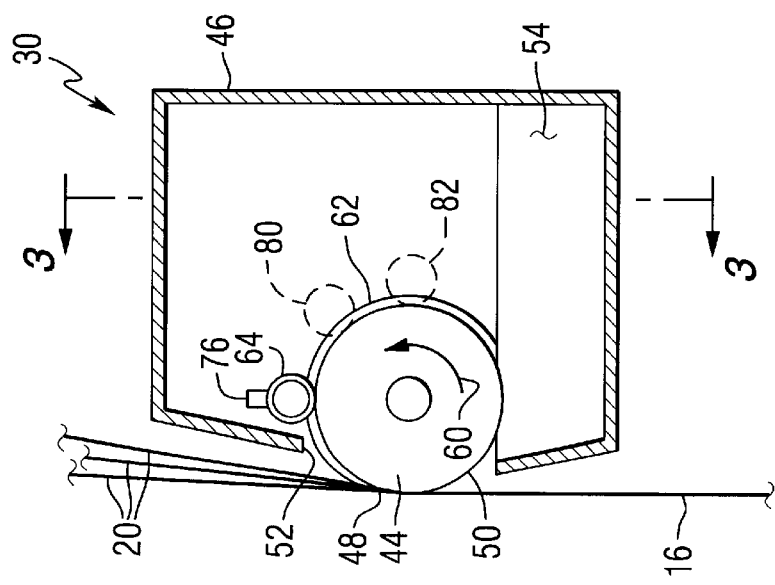
FIG. 3
FIG. 2

APPLICATOR FOR HIGH SOLIDS SIZING

BACKGROUND OF THE INVENTION

1. Field of the Invention

The present invention relates to a glass fiber size applicator for continuous glass fiber forming operations.

2. Technical Considerations and Prior Art

Glass fibers are commonly formed by attenuating molten glass through orifices in a bushing. The fibers are then drawn across an applicator, which coats at least a portion of the fiber surface with a sizing composition, gathered into one or more discrete strands by gathering shoes, and wound on a winding machine into a forming package.

Typical starch-oil sizing compositions used for yarns and fabrics can include up to about 7 wt % solids while typical sizing compositions used for direct reinforcement of polymers and elastomers can include up to about 14 wt % solids. In formulating sizing compositions, there are several advantages to increasing the amount of solids in the sizing. First, with a high solids content there is less water so that the sizing will dry faster on the glass fibers. Also because of the lower water content, there will be less migration of the sizing during drying of the forming package, resulting in a more uniform loss on ignition (LOI) throughout the forming package. In addition, as the fibers pass over the gathering shoe and are thereafter positioned on the forming package by the spiral, there is less of a tendency to lose a portion of the sizing from the coated glass fibers as the solids content of the sizing composition increases. By increasing the solids content and thus increasing the viscosity of the sizing, less size is lost during processing and the size that is left on the fibers has a greater amount of sizing constituents. As used herein, the terms "high solids" or "high solids content" mean a composition having at least about 20 wt % solids content.

One typical applicator design known and used by those skilled in the art incorporates a roller that is continuously coated with the sizing material. The applicator is positioned relative to the newly formed glass fibers such that the glass fibers contact just enough of the coated roller surface to coat at least a portion of the fiber surface. Another typical applicator design uses a coated belt to apply the sizing material to the glass fibers. For additional information regarding different types of applicators, see K. Loewenstein, *The Manufacturing Technology of Continuous Glass Fibres*, (Third Edition 1993) at pages 165–172, which teachings are incorporated by reference.

When applying sizing to the fibers, it is important to provide a smooth uniform film on the applicator roll so that a uniform, consistent coating can be applied to the glass fibers. However, it has been found as the amount of solids in the sizing increases and the sizing viscosity decreases, it is difficult to maintain a uniform film coating on the applicator roll. This results in a nonuniform application of the sizing to the glass fibers, as well as excessive buildup of the sizing at the gathering shoe and spiral. In addition, in high solids sizing formulations that do provide a good consistent film, it has been found that the applicator tends to apply too much size to the glass fibers. This can be corrected by slowing the speed at which the applicator roll is coated with the sizing, but if the speed is too slow, there can be excessive breakage of the glass fibers, especially in applicators that use a rubber belt to apply the sizing.

WO 98/06551 discloses single and dual roll applicators having a roller positioned in a pan supplied with the sizing composition. The rollers rotate within the pan to coat the applicator roller.

WO 98/29349 discloses a method and apparatus for applying a sizing composition to glass fibers wherein a moving gathering shoe positioned below the applicator causes the fibers to sweep back and forth along the sizing applicator.

U.S. Pat. No. 3,114,165 to Koteles, et al. discloses a wet film applicator that provides a wet film with a varying thickness.

U.S. Pat. No. 4,476,806 to Lubniewski, et al. discloses an applicator for applying a film of wet material in a preselected, uniform, initial wet film thickness on the top flat surface of a workpiece in a level position.

U.S. Pat. No. 4,869,200 to Euverand discloses a wet film applicator capable of forming films of uniform and nonuniform thicknesses.

It would be advantageous to provide an applicator that can control the thickness of a sizing on an applicator so as to efficiently and effectively coat glass fibers with a sizing composition having high solid content.

SUMMARY OF THE INVENTION

One aspect of the present invention is a film applicator for applying a coating to at least a portion of a surface of fibers, comprising: an enclosure having a reservoir to store a coating composition; a roller having a generally cylindrical surface positioned within the enclosure such that a first portion of the roller surface is immersed in the coating composition and a second portion of the roller surface extends through an opening in the enclosure to contact fibers; a drive to rotate the roller within the enclosure such that the surface of the roller can be coated with a film formed from the coating composition; and a bar positioned at least in close proximity to the roller surface, the bar having a contoured surface that provides a desired film thickness on the roller surface. In one particular embodiment of the invention, the bar includes a rod with a tightly wound wire, such that the wire forms the contoured surface along the length of the rod, and further includes a mounting arrangement to maintain the contoured surface of the bar in direct contact with the surface of the roller.

Another aspect of the present invention is a film applicator for applying coating to at least a portion of a surface of fibers, comprising: an enclosure having a reservoir to store a coating composition; a rod having a generally cylindrical surface positioned such that a portion of the rod surface extends beyond the enclosure; a roller having a generally cylindrical surface positioned within the enclosure such that a portion of the roller surface is immersed in the coating composition; a belt extending around and interconnecting the rod and the roller, wherein a first portion of the belt extends around the portion of the rod to contact the fibers and a second portion of the belt extends around the portion of the roller and is immersed in the coating composition; a drive to rotate the rod, roller and belt such that the surface of the belt can be coated with a film formed from the coating composition; and a bar positioned at least in close proximity to the belt surface and having a contoured surface that provides a desired film thickness on the belt surface prior to the fibers contacting the belt.

Still another aspect of the present invention is a method of controlling the thickness of a coating film on an applicator roller, comprising the steps of: rotating an applicator roller having a generally cylindrical surface in a coating composition so as to coat at least a portion of the surface of the roller with a film; and positioning a bar having a contoured surface at least in close proximity to the surface of the roller such that the contoured surface of the bar contacts the film and controls the amount of coating composition passing between the surface of the roller and the contoured surface of the bar.

Yet another aspect of the present invention is a method of controlling the thickness of a coating film on an applicator roller, comprising the steps of: providing an enclosure having a reservoir to store a coating composition; positioning a rod having a generally cylindrical surface relative to the enclosure such that a portion of the rod surface extends beyond the enclosure; positioning a roller having a generally cylindrical surface within the enclosure such that a portion of the roller surface is immersed in the coating composition; extending a belt around and interconnecting the rod and the roller, such that a portion of the belt extends around the portion of the roller and is immersed in the coating composition; rotating the rod, roller and belt such that the surface of the belt is coated with a film formed from the coating composition; and positioning a bar having a contoured surface at least in close proximity to the surface of the belt such that the contoured surface of the bar contacts the film and controls the amount of coating composition passing between the surface of the belt and the contoured surface of the bar.

BRIEF DESCRIPTION OF THE DRAWINGS

FIG. 2 is an enlarged, cross-sectional view of the applicator shown in FIG. 1 incorporating features of the present invention, with portions removes for clarity.

FIG. 3 is view taken along line 3—3 of FIG. 2.

DETAILED DESCRIPTION OF THE INVENTION

The present invention will be discussed generally in the context of its use in coating glass fibers. However, one skilled in the art should understand that the present invention is useful in the processing of other fibers as discussed below.

Figure 1:
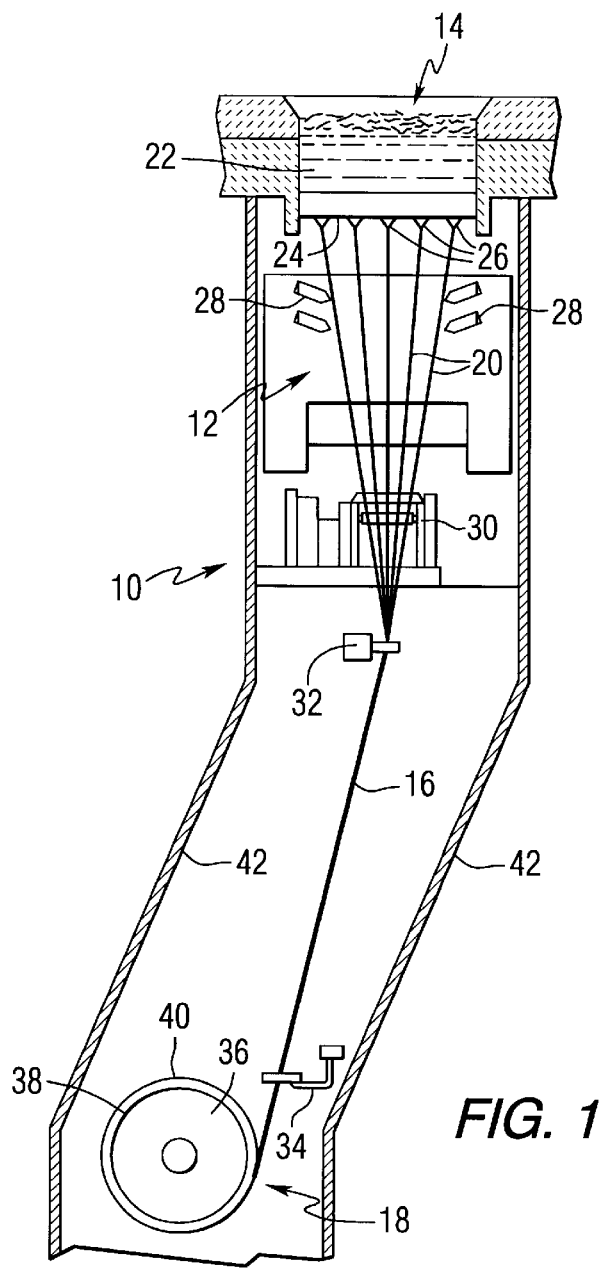
FIG. 1 is an elevational view of a forming station of a typical glass fiber forming operation, with portions removed for clarity.

Referring to FIG. 1, a forming station 10 of a glass fiber forming operation includes a forming apparatus 12 having a strand supply device 14 for supplying at least one strand 16 to a winder 18. As used herein, the term "trand" means a plurality of continuous fibers 20. Fibers 20 are supplied from a glass melting furnace or forehearth (not shown) containing a supply of a fiber forming molten glass 22 and having a metal bushing 24 attached to the bottom of the forehearth. The molten glass 22 is drawn through a plurality of nozzles 26 in the bushing 24 and attenuated by the winder 18 to form glass fibers 20. Water sprays 28 can be used to spray water at the newly formed fibers 20 to cool them after being drawn from the bushing 24. For clarity in the drawing, the ceramic materials, cooling tubes and fins typically surrounding the metal bushing have been omitted. Alternatively, the forming apparatus 12 can be, for example, a forming device for synthetic textile fibers or strands in which fibers are drawn from nozzles, such as but not limited to a spinneret, as is known to those skilled in the art. Typical forehearths and glass fiber forming arrangements are shown in *Loewenstein* at pages 85–107 and pages 115–135, which are hereby incorporated by reference.

The glass fibers 20 can be formed from any type of fiberizable glass composition known to those skilled in the art, including those prepared from fiberizable glass compositions such as "E-glass", "A-glass", "C-glass", "D-glass", "R-glass", "S-glass" and E-glass derivatives. As used herein "E-glass derivatives" means glass compositions, which include minor amounts of fluoride and/or boron, and preferably are fluorine-free and/or boron-free. Furthermore, as used herein, "minor" means less than one weight percent fluorine and less than five weight percent boron. Preferred glass fibers are formed from E-glass and E-glass derivatives. Such compositions are well known to those skilled in the art. If additional information is needed, such glass compositions are disclosed in *Loewenstein* at pages 30–44, 47–60, 115–122 and 126–135 and U.S. Pat. Nos. 4,542,106 (see column 2, line 67 through column 4, line 53) and U.S. Pat No. 5,789,329 (column 2, line 65 through column 4, line 24), which are hereby incorporated by reference.

The glass fibers can have a nominal filament diameter ranging from about 5.0 to about 35.0 micrometers (corresponding to a filament designation of D through U and above). For further information regarding nominal filament diameters and designations of glass fibers, see *Loewenstein* at page 25, which is hereby incorporated by reference.

The present invention is also useful in coating fibers or strands of materials other than glass fibers ("non-glass fibers"). Suitable non-glass fibers which can be formed and coated using in the present invention are discussed at length in the *Encyclopedia of Polymer Science and Technology*, Vol. 6 (1967) at pages 505–712, and U.S. patent application Ser. No. 08/828,212 at page 15, line 21 through page 17, line 10, which are hereby incorporated by reference.

Typically, after the glass fibers 20 are drawn from the bushing 24, they are contacted with an applicator 30, which is an object of the present invention, to apply a coating or sizing composition to at least a portion of the surface of the glass fibers 20 to protect the fiber surface from abrasion during processing. As used herein, the terms "size", "sized" or "sizing" refer to the aqueous composition commonly applied to the fibers 20 immediately after formation. Typical sizing compositions can include as components, among other constituents, film-formers, lubricants, coupling agents, emulsifiers and water. Non-limiting examples of sizing compositions that can be used in the present invention are disclosed in U.S. Pat. Nos. 3,997,306 (see column 4, line 60 through column 7, line 57); 4,305,742 (see column 5, line 64 through column 8, line 65) and U.S. Pat No. 4,927,869 (see column 9, line 20 through column 11, line 19), and U.S. patent application Ser. Nos. 08/787,735 (see page 7, line 1 through page 12, line 13 and page 28, line 15 through page 39, line 10) and 08/984,429 (see page 10, line 1 through page 15, line 17), which are hereby incorporated by reference. Additional information and further non-limiting examples of suitable sizing compositions are set forth in *Loewenstein* at pages 237–291, which are hereby incorporated by reference.

A gathering device 32 mounted at the forming station 10 in any convenient manner is used to gather selected groups of fibers 20 and form one or more strands 16. The strands 16 typically have about 100 to about 15,000 fibers per strand, and preferably about 200 to about 7,000 fibers, and are drawn through the gathering device 32 at speeds of about 2,500 to about 18,000 feet per minute (about 762 to about 5,486 meters per minute). Although not limiting in the instant invention, the gathering device 32 typically divides the fiber 20 to form up to about 20 strands.

The forming apparatus 12 also includes a spiral 34 for traversing the strands 16 along the length of the axis of rotation of a rotatable collet 36 of the winder 18 during winding of the strand 16 about the surface 38 of the collet 36 to produce a forming package 40. Sidewalls 42 are positioned to generally enclose the forming station 10 and isolate the bushing 24, applicator 30, gathering device 32, strands 16 and fibers 20 from similar elements in adjacent forming stations. Sidewalls 42 also provide support for other devices that can be used at the forming station 10 in forming the strands 16.

Although not limiting in the present invention, FIGS. 2 and 3 illustrate an embodiment of an applicator incorporating features of the present invention. More specifically, applicator 30 is a roller applicator with a roller 44 having a generally cylindrical surface 50 positioned within an enclosure 46 such that a portion 48 of the roller surface 50 extends through an opening 52 in the front portion of the enclosure 46. The enclosure 46 includes a sizing reservoir 54 that holds the sizing to be applied to the glass fibers 20. A float arrangement (not shown) or other monitoring system known in the art maintains a generally constant level of sizing within the reservoir 54. The roller 44 is positioned within the enclosure 46 such that the lower portion of the roller 44 is immersed within the sizing composition. The roller 44 is rotated within the enclosure 46 in any convenient manner known in the art. For example and without limiting the present invention, a drive 56 is connected to a shaft 58 that extends along the centerline of the roller 44 to rotate the roller in the desired direction and at the desired speed. Although not limiting in the present invention, the roller 44 is generally rotated at a speed between about 30 to about 150 RPMs in the same direction that the glass fibers 20 pass over the roller surface 50, i.e. direction 60 as indicated in FIG. 2. As the roller 44 rotates, its surface 50 is coated with a film 62 formed by the sizing. A portion of this film 62 is transferred onto at least a portion of the glass fiber surface as the glass fibers 20 contact portion 48 of the roller 44, as shown in FIG. 2. Although not limiting in the present invention, the thickness of film 62 as it contacts the glass fibers 20 should be between about 0.1 to about 0.4 mm (about 3 to about 10 mils).

With continued reference to FIGS. 2 and 3, applicator 30 includes a bar 64 within the enclosure positioned such that bar surface 66 is at least in close proximity to, and preferably in direct contact with, and extends along the surface of the roller 44. As used herein, "direct contact" means that portions of bar surface 66 are in contact with portions of roller surface 50. Although not limiting in the present invention, in the particular embodiment shown in FIGS. 2 and 3, bar 64 is positioned above roller 44, although other bar positions can be used, as will be discussed later in more detail.

Figure 7:
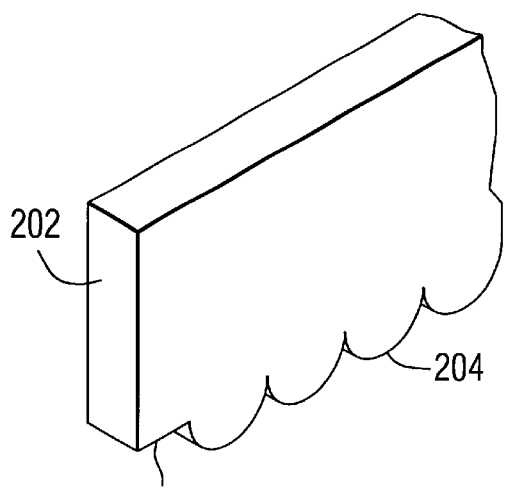
FIGS. 7 and 8 are alternate embodiments of the present invention.
Figure 8:
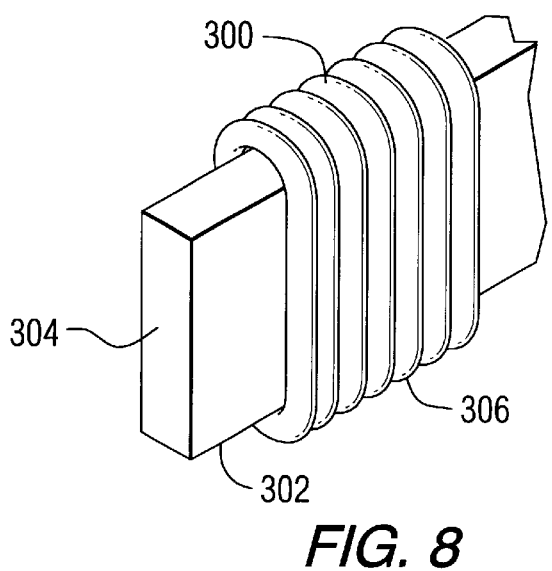

The surface 66 of the bar 64 is configured to ensure that the surface of the roller 44 is coated with a smooth uniform film of sizing having a desired thickness. More specifically, and without limiting the present invention, bar 64 is a wire wound bar that includes a center rod 68 with a wire 70 wrapped around the rod 68, as shown in FIG. 3. This type of bar is sometimes referred to as a drawbar or coating bar. Although not required, the cross section of rod 68 can be circular as shown in FIG. 2, or some other shape, such as but not limited to rectangular as shown in FIGS. 7 and 8, which will be discussed later in more detail. The surface of the wire 70 forms contoured bar surface 66 and controls the amount of film 62 that passes between the bar surface 66 and the roller surface 50. More specifically, the volume of sizing which forms the film 62 and establishes the film thickness prior to the glass fibers 20 contacting roller 44 is determined by the interstitial spaces 71 (shown in FIGS. 4 and 5) between the wires 70 in combination with the spacing of the bar surface 68 from the roll surface 50. It should be appreciated that the diameter of the rod 68 and the gauge and spacing of the wire 70 will control the size of these interstitial spaces and thus the film thickness on the roller 44. Although not limiting in the present invention, the wire diameter varies between about 0.7 to about 2.5 mm (about 0.028 to about 0.98 inches), and preferably between about 1 to about 2 mm (about 0.039 to about 0.078 inches).

Figure 4:
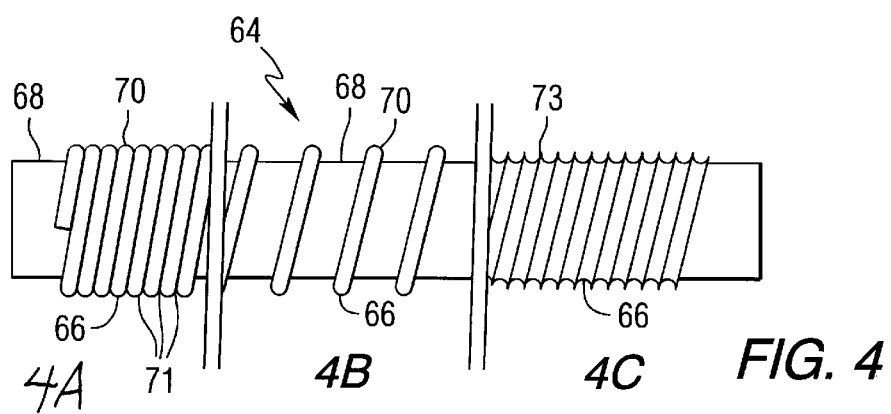
FIGS. 4A, 4B and 4C illustrate embodiments of a bar incorporating features of the present invention.

Although not limiting in the present invention, FIG. 4 shows several bar configurations each with a contoured surface as taught in the present invention. FIG. 4A illustrates the embodiment of bar 64 discussed above and shown in FIG. 3 wherein the wire is "tightly wound" around rod 68, i.e. each successive winding of the wire is in contact with adjacent wire windings along surface 66. FIG. 4B shows a wire wound bar wherein the wire is "loosely wound", i.e. each successive winding of the wire is spaced or gapped from adjacent wire windings along surface 66. In FIG. 4C, the bar surface 66 is machined to a desired contour. In addition, the ridges 73 on the contoured surface 66 can be concentric or positioned along a continuous spiral as shown in FIG. 4C.

Although not limiting in the present invention, in the particular embodiment shown in FIGS. 2 and 3, the bar 64 is positioned relative to the roller 44 such that at least a portion of contoured bar surface 66 overlays at least a portion of the roller surface 50. Depending on the mounting arrangement of the bar 64, as will be discussed later in more detail, bar surface 66 can either directly contact the roller surface 50, as shown in the left side of FIG. 5, or it can be spaced above roller surface 50, as shown in the right side of FIG. 5. It should be appreciated that in the embodiment of the invention where bar surface 68 is in direct contact with roller surface 50 as shown in the left side of FIG. 5, the thickness of the film 62 will be controlled by the interstitial spaces 71 formed by wire 70.

The bar 64 can be mounted in the applicator 30 in a variety of different ways depending on the desired contact relationship between bar surface 66 and the roller surface 50. For example, and without limiting the present invention, the bar 64 is preferably mounted in the applicator 30 such that it maintains direct contact with and rides on the roller surface 50. With this configuration, the film thickness of the sizing on the roller 44 will be fixed because the interstitial spaces between the roller surface 66 and the bar surface 50 will not vary. In addition, bar 64 can be fixed so that it cannot rotate, be freewheeling so that it rotates as the roller 44 rotates, or a drive (not shown) can be connected to rod 68 of bar 64 to control the direction and speed of the bar 64 rotation.

The bar 64 can be maintained against the surface 50 of the roller 44 in any convenient mean known in the art. For example, the dead weight of the bar 64 can be sufficient to maintain its direct contact with the roller 44. As an alternative, a biasing arrangement (not shown) for example, but not limiting to, springs or pressure cylinders, can be used to hold the bar 64 against the roller surface 50. If desired, the ends 72 of the rod 68 can be mounted in bearing blocks (not shown) mounted in or adjacent to sidewalls 74 of enclosure 46 to hold the bar 64 against roller surface 50. As an alternative, the bearing block can also be positioned to hold the bar 64 in spaced relation from the roller 44.

In another non-limiting embodiment of the present invention, the bar 64 can move relative to the roller 44, i.e. the bar 64 can move relative to the roller surface 50 between a first position and a second position. Such an arrangement can be achieved, for example, by mounting the ends 72 of the bar 64 within slotted openings 76 in the enclosure 46 so that the bar 64 can move horizontally and/or vertically relative to the roller 44. A non-limiting example of an application where such an arrangement would be desirable includes an applicator arrangement where the bar 64 would move closer to or away from the surface 50 of the roller 44 in response to changes in the viscosity of the sizing composition. If desired, the biasing arrangement discussed earlier can be used to allow the necessary movement of the bar 64.

Figure 5:
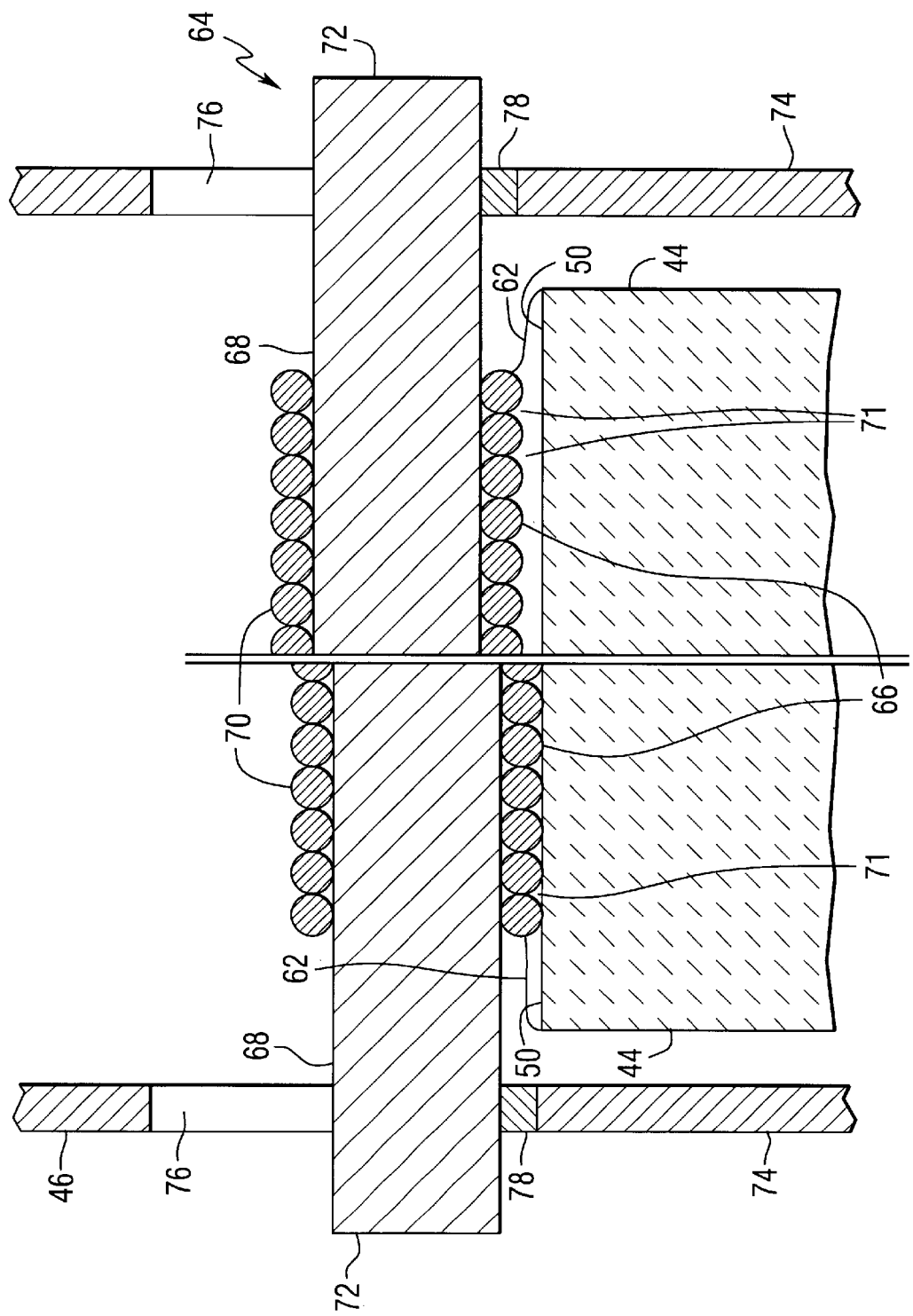
FIG. 5 is an enlarged portion of FIG. 3, with portions removed for clarity.

In one particular embodiment of the invention, the roller 44 of the applicator 30 was a 2 inch (5.08 cm) diameter graphite roll and the bar 64 included a 0.75 inch (1.905 centimeter) stainless steel core 68 with 0.060 inch (1.52 millimeter) diameter stainless steel wire 70 wrapped about the core. This type of bar is available from R.D. Specialties Inc., Webster, N.Y. The ends 72 of the bar 64 extended through openings 76 in the sidewalls 74 and bar 64 was positioned such that bar surface 66 was in direct contact with roller surface 50. Bar 64 was freewheeling, i.e. as roller 44 rotated, bar 64 rotated due to the direct contact therebetween, and remained in direct contact with the roll 44 due to the weight of the bar 64. The base 78 of each opening 76 included a bearing material as shown in FIG. 5 that allowed the bar 64 to rotate without wearing or seizing the bar ends 72. Although not limiting in the present invention, the bearing material in this particular embodiment of the invention was bronze.

Although FIGS. 2 and 3 show the position of the bar 64 to be above the roller 44, bar 64 can be positioned anywhere along the surface 50 of the roller 44 that would control the thickness of the film 62 prior to fibers 20 contacting roller 44, for example as shown by dotted lines 80 and 82 in FIG. 2.

Figure 6:
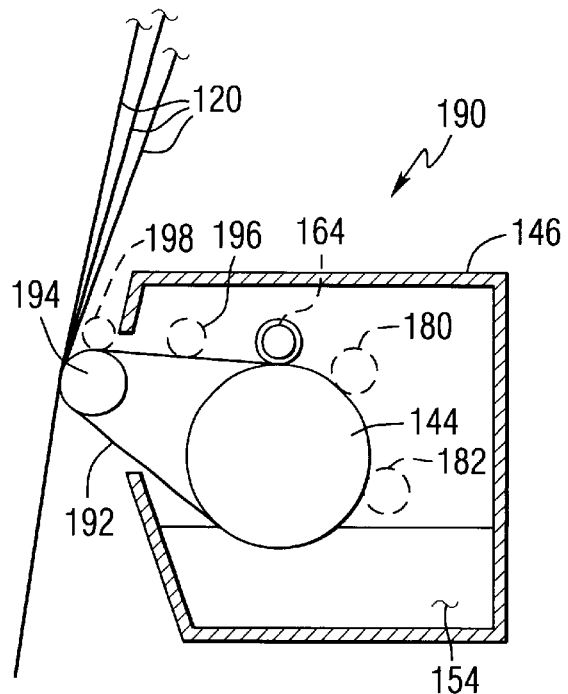
FIG. 6 is a view similar to FIG. 2 illustrating an alternate type of sizing applicator incorporating features of the present invention.

The bar 64 of the present invention can be used to control the film thickness in other types of applicator configurations. For example, FIG. 6 illustrates a belt-type applicator 190 which includes a belt 192, for example a rubber sleeve, that moves around a roller 144 positioned within enclosure 146 and partially submerged in a sizing reservoir 154, and a rod 194 positioned at least partially outside the enclosure 146. A drive arrangement (not shown) rotates the roller, rod and belt. For example and not limiting in the present invention, a drive can rotate roller 144, which in turn rotates both belt 192 and rod 194. Belt 192 picks up a coating of fiber size as is moves around the circumference of a rotating roller 144 and is submerged in the sizing reservoir 154 and the size is transferred to the glass fibers 120 as they pass over the belt 192 at rod 194. The thickness of the sizing is controlled by contacting the size on belt 192 with bar 164 prior to the glass fibers 120 contacting the belt 192 at rod 194 as shown in FIG. 6. Bar 164 of the present invention can be positioned at other locations along roller 144, for example, as indicated by dotted lines 180 and 182, or it can be positioned along belt 192 between roller 144 and rod 194, for example as indicated by dotted line 196 in FIG. 6, or it can be positioned above the rod 194 as indicated by dotted line 198 in FIG. 6.

Although it is preferred that the bar 64 illustrated in FIGS. 2 and 3 and discussed above be a wire wrapped bar with a generally circular cross-section, it is contemplated that a flat bar with a contoured edge can provide the desired film thickness. For example and without limiting in the present invention, a longitudinal edge 200 of a flat bar 202 can be machined to the desired configuration and form a contoured edge 204 as shown in FIG. 7, or a wire 300 can be wrapped around edge 302 of a flat bar 304 to form a contoured edge 306 as shown in FIG. 8. Contoured edges 204 and 306 can then be positioned at least in close proximity to and preferably in contact with surface 50 of roller 44.

The present invention provides an applicator that ensures consistent sizing application to the glass fibers by providing a uniform film thickness on the applicator roller. Although the applicator is particularly useful for use in applying sizing compositions with a high solids content, it should be appreciated that the applicator can be used with any sizing formation to ensure uniform film thickness and desired sizing application.

It will be appreciated by those skilled in the art that changes could be made to the embodiments described above without departing from the broad inventive concept thereof. It is understood, therefore, that this invention is not limited to the particular embodiments disclosed but is intended to cover modifications which are within the spirit and scope of the invention as defined by the appended claims.

I claim:

1. A film applicator for applying a coating to at least a portion of a surface of fibers, comprising:
    an enclosure having a reservoir to store a coating composition;
    a roller having a generally cylindrical surface positioned within the enclosure such that a first portion of the roller surface is immersed in the coating composition and a second portion of the roller surface extends through an opening in the enclosure to directly contact fibers and apply a coating to at least a portion of a surface of the fibers;
    a drive to rotate the roller within the enclosure such that the surface of the roller can be coated with a film formed from the coating composition; and
    a bar positioned at least in close proximity to the roller surface, the bar having a contoured surface that provides a desired film thickness on the roller surface.

2. The applicator according to claim 1 wherein the bar includes a rod wound with a wire such that the wire forms the contoured surface along the length of the rod.

3. The applicator according to claim 2 wherein the wire is tightly wound around the bar and further including a mounting arrangement to maintain the contoured surface of the bar in direct contact with the surface of the roller.

4. The applicator according to claim 3 wherein the wire has a diameter between about 0.7 and about 2.5 mm.

5. The applicator according to claim 4 wherein the wire has a diameter between about 1 and about 2 mm.

6. The applicator according to claim 2 wherein the wire is tightly wound around the rod.

7. The applicator according to claim 2 wherein wire is wound around the rod such that the wire is loosely wound around the bar.

8. The applicator according to claim 1 wherein the contoured surface of the bar includes a groove.

9. The applicator according to claim 1 further including a mounting arrangement to maintain the contoured surface of the bar in direct contact with the roller surface.

10. The applicator according to claim 9 wherein the bar has sufficient weight to maintain direct contact with the roller surface.

11. The applicator according to claim 1 further including a mounting arrangement to maintain the contoured surface of the bar in spaced apart relation from the roller surface.

12. The applicator according to claim 1 further including a mounting arrangement that permits movement of the bar between a first position and a second position.

13. The applicator according to claim 1 wherein the bar rotates in a direction opposite the direction of rotation of the roller.

14. The applicator according to claim 1 wherein the bar includes a flat bar and the contoured surface is a longitudinally extending edge of the flat bar shaped to a desired configuration.

15. A film applicator for applying coating to at least a portion of a surface of fibers, comprising:

- an enclosure having a reservoir to store a coating composition;
- a rod having a generally cylindrical surface positioned such that a portion of the rod surface extends beyond the enclosure;
- a roller having a generally cylindrical surface positioned within the enclosure such that a portion of the roller surface is immersed in the coating composition;
- a belt extending around and interconnecting the rod and the roller, wherein a first portion of the belt extends around the portion of the rod to contact the fibers and a second portion of the belt extends around the portion of the roller and is immersed in the coating composition;
- a drive to rotate the rod, roller and belt such that the surface of the belt can be coated with a film formed from the coating composition; and
- a bar positioned at least in close proximity to the belt surface and having a contoured surface that provides a desired film thickness on the belt surface prior to the fibers contacting the belt.

16. The applicator according to claim 15, wherein the bar includes a rod tightly wound with a wire, with the wire forming the contoured surface along the length of the rod, and further including a mounting arrangement to maintain the contoured surface of the bar in direct contact with the surface of the roller.

17. The applicator according to claim 16 wherein the wire has a diameter between about 0.7 and about 2.5 mm.

18. A film applicator for applying a coating to at least a portion of a surface of fibers, comprising:

- an enclosure having a reservoir to store a coating composition;
- a roller having a generally cylindrical surface positioned within the enclosure such that a first portion of the roller surface is immersed in the coating composition and a second portion of the roller surface extends through an opening in the enclosure to contact fibers and apply a coating to at least a portion of a surface of the fibers;
- a drive to rotate the roller within the enclosure such that the surface of the roller can be coated with a film formed from the coating composition; and
- a bar positioned at least in close proximity to the roller surface, the bar comprising a flat bar having a longitudinally extending edge and a wire wound around at least a portion of the edge to form a contoured surface that provides a desired film thickness on the roller surface.

* * * * *